US007825857B2

(12) United States Patent
Lackey et al.

(10) Patent No.: US 7,825,857 B2

(45) Date of Patent: Nov. 2, 2010

(54) SYSTEM, METHOD AND APPARATUS FOR REDUCING THE EFFECTS OF LOW LEVEL INTERFERENCE IN A COMMUNICATION SYSTEM

(75) Inventors: Raymond J. Lackey, Bohemia, NY (US); Martin E. Somin, Huntington, NY (US); Sondra Somin, legal representative, Huntington, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 26 days.

(21) Appl. No.: 12/322,918

(22) Filed: Feb. 9, 2009

(65) Prior Publication Data

US 2010/0201572 A1 Aug. 12, 2010

(51) Int. Cl.
*G01S 3/16* (2006.01)

(52) U.S. Cl. ...................................... 342/383; 342/378

(58) Field of Classification Search ................. 342/368, 342/378, 382, 383; 702/150, 151; 455/132, 455/272, 562.1
See application file for complete search history.

(56) References Cited

U.S. PATENT DOCUMENTS 6,975,672 B2 * 12/2005 Bottomley et al. .......... 375/148
2002/0169578 A1 * 11/2002 Yang .......................... 702/152
2007/0142089 A1 * 6/2007 Roy ........................ 455/562.1

* cited by examiner

*Primary Examiner*—Dao L Phan
(74) *Attorney, Agent, or Firm*—Dilworth & Barrese, LLP; Leo G. Lenna

(57) ABSTRACT

An adaptive antenna array control system and associated method is provided for continuously and automatically assigning resources to either protect against strong interferers or to shade a spatial region, reducing gain in that spatial region, to protect against potential low power interference, thus providing improved adaptive interference cancellation system performance with limited resources. The Array biasing system is provided as an element of an adaptive antenna array control loop.

19 Claims, 14 Drawing Sheets

Array biased For Mast Multipath Protection -- ARL-1300 Array

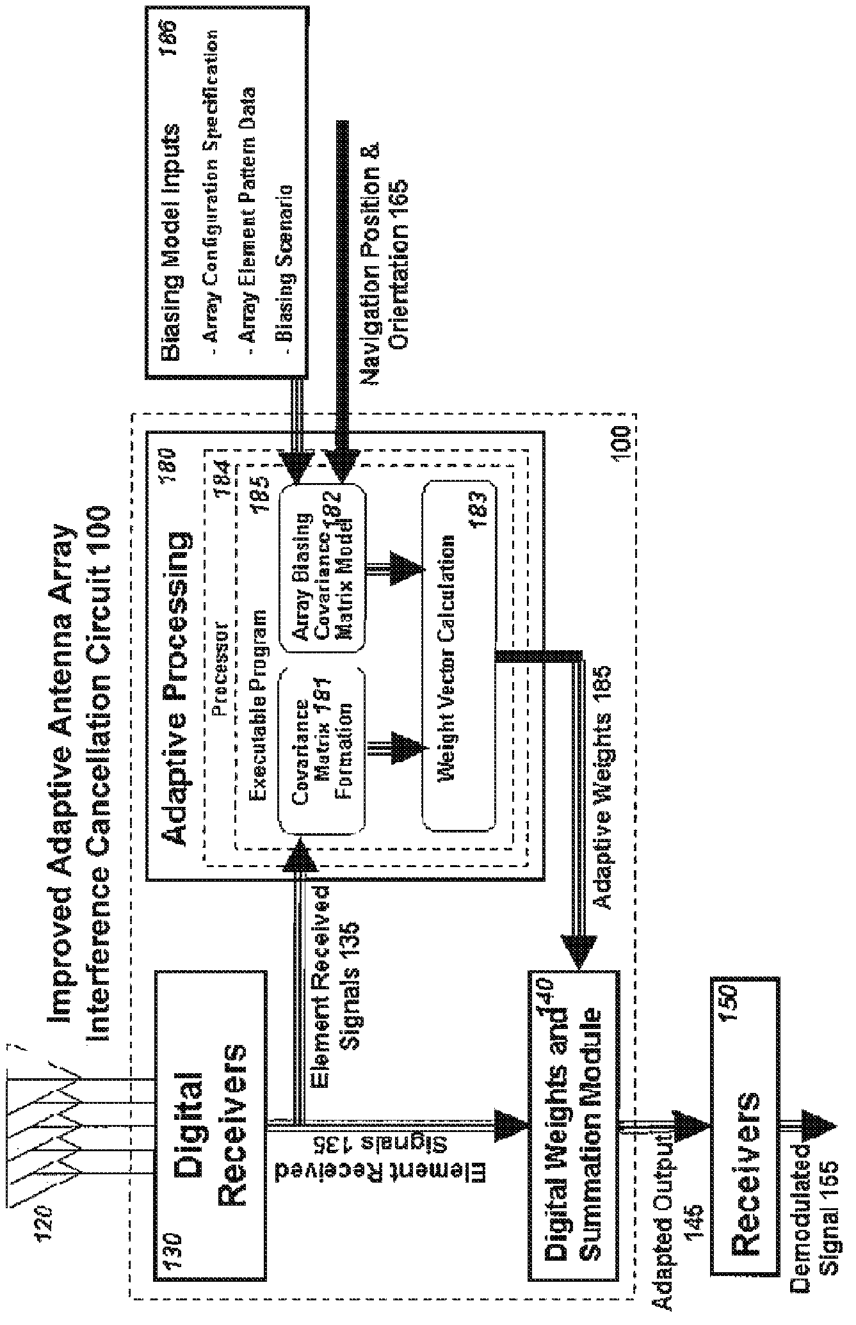
Figure 13 – Block Diagram for a Dynamic System

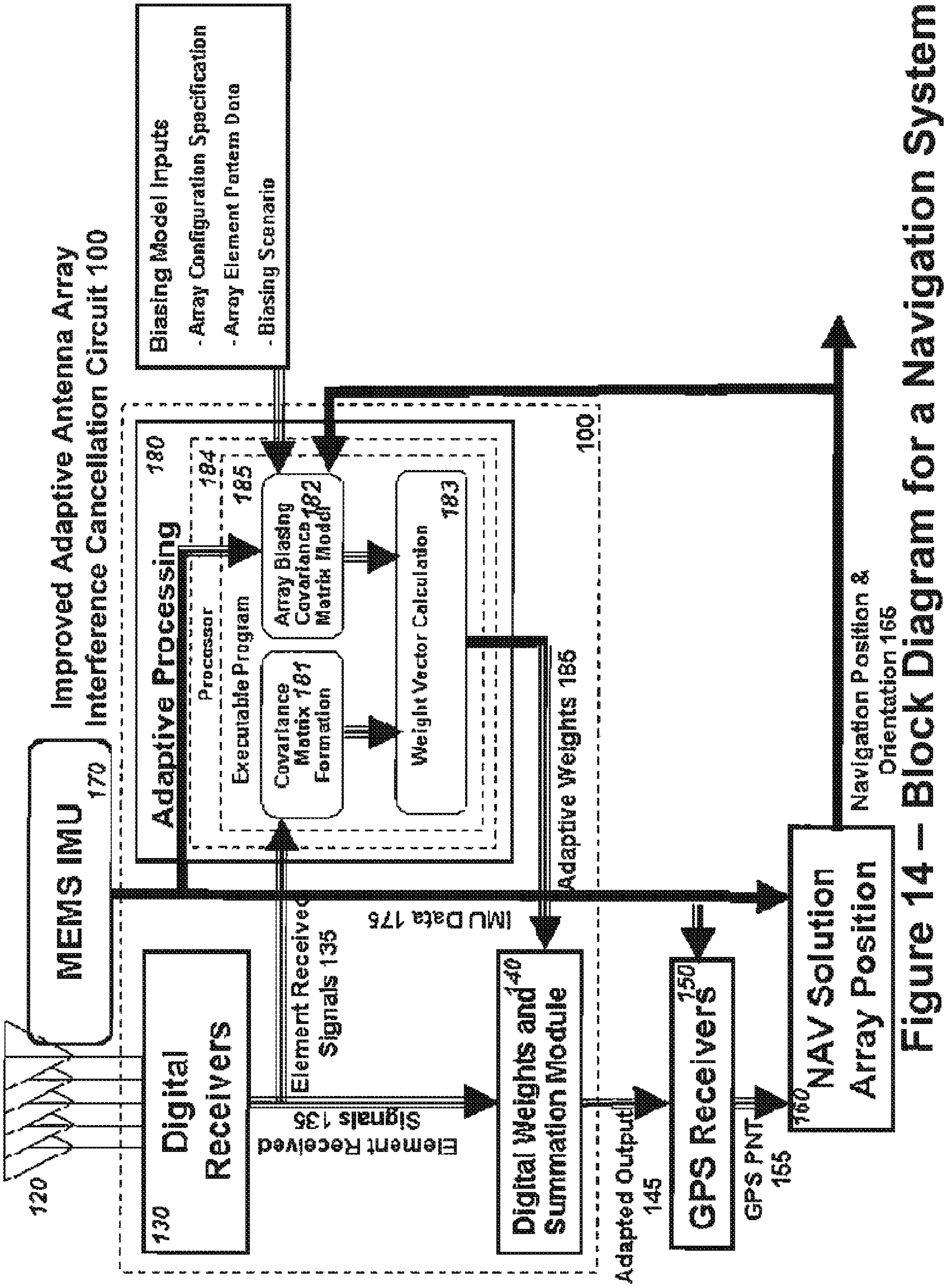
Figure 14 – Block Diagram for a Navigation System

SYSTEM, METHOD AND APPARATUS FOR REDUCING THE EFFECTS OF LOW LEVEL INTERFERENCE IN A COMMUNICATION SYSTEM

FIELD OF THE INVENTION

The invention relates generally to the field of radio communication and, in particular, to the reduction of interference in signals coupled from a receive antenna array to a receiver in the presence of a local multipath and/or low-level transmitters.

DESCRIPTION OF THE RELATED ART

Unwanted (i.e., interfering) signals manifest themselves in several ways. Interference can cause a reduction in the sensitivity of a receiver (receiver desensitization), masking of a desired signal, tracking of an undesired interfering signal and loss of the desired signal, and processing of the unwanted interfering signal instead of the desired signal. Each of these manifestations of interference limits the communication capabilities of the radio system afflicted by this problem. Undesirous effects of interference can manifest themselves, for example, as some combination of the absence of usable output from a receiver, false signals from a receiver, and malfunction of a device which is operated by the receiver. During emergency situations, the loss and corruption of the desired signal can be critical.

Low level spread spectrum signals operating near or below thermal noise floor are especially susceptible to local multipath signals causing either coherent signal delay of the tracked signal or incoherent signal delay causing loss of lock on the desired signal path and tracking of the delayed signal. One method of intentional jamming or thwarting of the low level signals of a satellite navigation system is the reception and retransmission of the satellite signal or a transmission of a satellite waveform to mislead the receiver into tracking the interferer rather than the satellite.

High power interferers are easily identified and mitigated by adaptive antenna systems. Low-power interference is more difficult to identify and eliminate. Fixed installations have used shaped antenna patterns that have permanent nulls in the direction of buildings or other multipath sources or eliminate low elevation reception, assuming that is the general area from which interference can originate.

When the scenario is changing with time, such as when an airborne platform banks to turn or is sharply ascending or descending, the orientation of the antenna to ground is also changing and the above described approaches (i.e., shaped antenna patterns utilizing permanent nulls) become inadequate. One proposed solution for adapting to a changing scenario is the use of adaptive antenna algorithms. These Adaptive antenna algorithms use a pilot vector to bias the array for a particular pointing direction but these pilot vectors are generally calculated to track a single satellite, or other source, and the adaptive process is trusted to form a sharp null in a particular interferer direction. While this solution has applicability to strong point sources of interference, it is not applicable to low level (i.e., weak) jamming sources that don't fit the algorithm. Low level jamming or multipath interference threat regions are often over large regions, described as follows.

A typical antenna for interference cancellation utilizes a correlation-based adaptive controller using feedback derived after the cancellation process to minimize the energy passed through the system under the constraints of the initial pilot vector. The system attacks signals on the basis of their strength so it works well for strong signals but not weak ones and it requires a minimum of one degree of freedom to form each independent null or beam. As a scenario becomes over constrained, having more interferers than nulling degrees of freedom, the system forms compromises on weights to minimize the total power passed. Since these methods don't work with weak signals, the antenna array is designed with antenna factors that eliminate whole areas of typical interference sources. Unfortunately, elimination of areas of reception either reduce navigation resolution or tie up major resources on a potential low-level problem and do not allow them to be used for greater problems when they occur.

A need therefore exists for an adaptive communication system and associated method for continuously adjusting a communication receiver's resources such that biases against reception from interference directions can be dynamically adjusted in real time in response to changing levels and direction of interference. The adaptive system must have full information for decision making to make best use of the resources available.

SUMMARY OF THE INVENTION

It is therefore an object of the present disclosure to provide a system, apparatus and method for reducing the effects of low level interference in a communication system.

It is another object of the present disclosure to provide a method and apparatus in which an adaptive antenna array can be biased against a reception area that has potential of being a source of low level interference without substantially affecting the quality of a desired signal reception.

It is yet another object of the present disclosure to preserve the flexibility of allocating the nulling resources to the area of greatest need as a threat scenario changes to preserve an existing communication link.

It is still another object of the present disclosure to provide a method and apparatus for injecting a bias region into an adaptive antenna array process so that a processor has the flexibility of dynamically adjusting weights to minimize interference.

It is a more particular object of the present disclosure to reduce the mathematical processing load in the control of an adaptive array implementing a flexible pilot vector and an adaptive process.

It is yet another object of the present disclosure to provide a method and apparatus for calculating the weights of an adaptive antenna array to minimize interference of both strong interferers and potential low level interference from spatial areas of threat.

The present disclosure provides a system and method for adaptively biasing an adaptive antenna array against reception from a particular spatial region as an element of an adaptive interference cancellation system. More particularly, a complex pilot vector is used to bias an adaptive antenna array against reception from a particular spatial region as an element of an adaptive interference cancellation system without interfering with an independent pilot vector that may be for general spatial signal reception or a focused spatial direction. A biasing control system provides simulated inputs to the adaptive process as if there were a number of low level interferers scattered over an area so that the adaptive process will use available resources to reduce gain in that region in the absence of other greater threats but still allow these resources to be employed by the adaptive process to accommodate sudden and immediate threats which supersede the simulated threats. In this manner, the biasing control system and associated method of the present disclosure provide improved resource allocation by injecting the biasing region information into the adaptive process with an adjustable level of priority or importance.

In accordance with one embodiment of the present disclosure a bias control system is provided for reducing interference from low level signals originating in areas of suspected interference sources. The bias control system interfaces with the adaptive control system to allow the adaptive control system to optimally utilize all available resources in accordance with a changing environment.

In accordance with one embodiment of the present disclosure, a method is provided for continuously and automatically adjusting the spatial rejection bias according to the changing environment of a moving platform by adjusting the bias area relative to the platform's position and orientation.

According to one aspect of the method described above, dynamic adjustment of the bias control considers both direction and degree of importance compared to the most recent adaptive nulling result.

In different embodiments, the system may be implemented in integrated or independent processors.

BRIEF DESCRIPTION OF THE DRAWINGS

These and other objects, features and advantages of the invention will be apparent from a consideration of the following Detailed Description Of The Invention considered in conjunction with the drawing Figures, in which:

FIG. 13 illustrates a top-level block diagram of an improved adaptive antenna array interference cancellation system, where the platform has dynamics affecting the relative angles of the biasing area, according to one embodiment.

FIG. 14 illustrates at top-level block diagram of an improved adaptive antenna array interference cancellation system, according to one embodiment, where the platform has dynamics affecting the relative angles of the biasing area and the system is being used to protect the GPS reception.

DETAILED DESCRIPTION OF THE INVENTION

Figure 1:
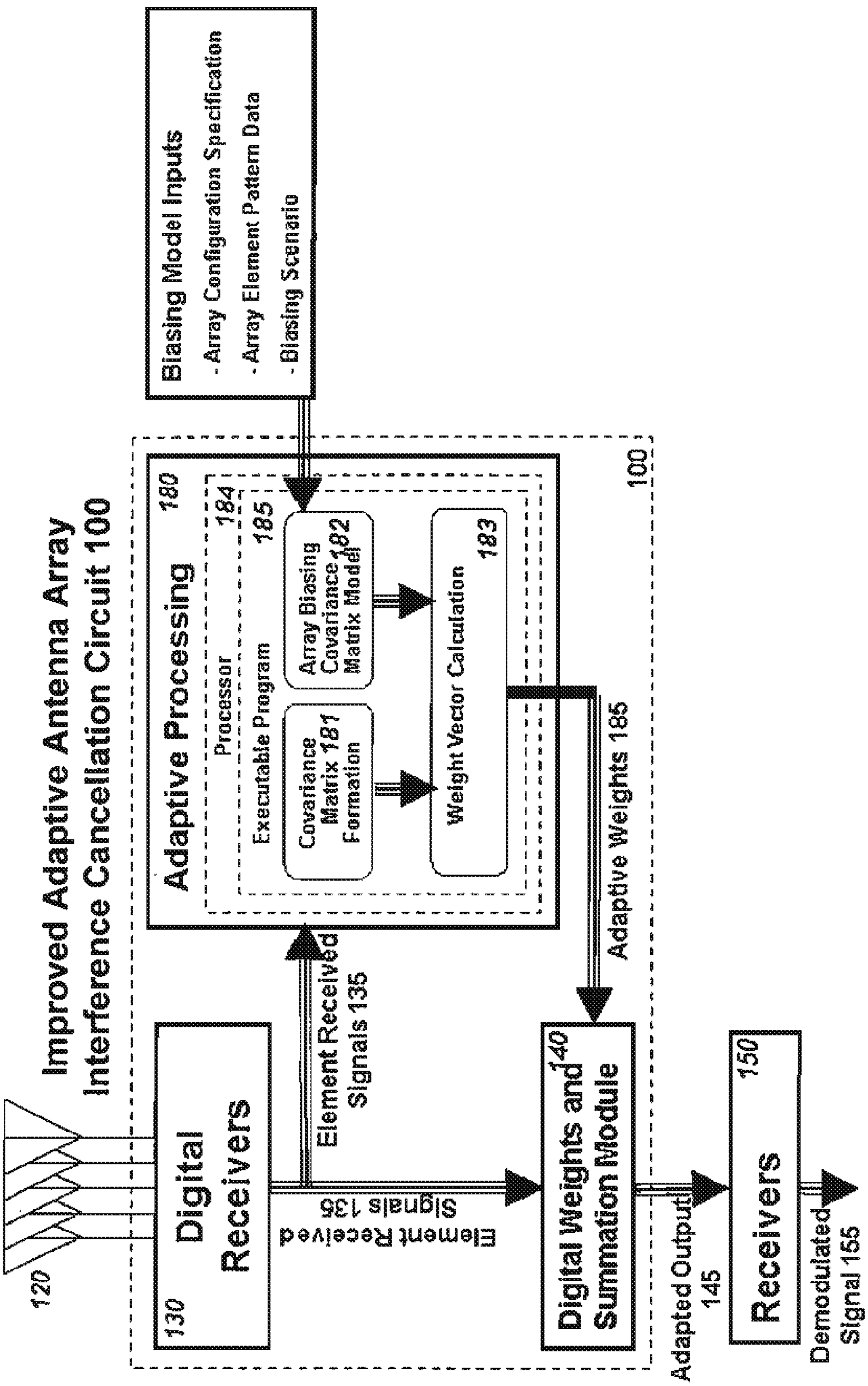
FIG. 1 illustrates the general module diagram of an improved adaptive antenna array interference cancellation system, according to one embodiment.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Overview

The present disclosure is directed to a spatial region biasing system as part of an adaptive array system to provide a biasing of the array factor, defined herein as the shaping of the quiescent array pattern by adjusting the weights on individual elements, such that the biasing results in reduction of the array gain in a particular region rather than a sharp null on a particular signal source, as is presently performed in the prior art when adaptively nulling an interferer.

In one aspect, resources that are utilized in the spatial region biasing system to protect a communications receiver against possible low-power interference may be dynamically re-allocated in real-time and made available for usage in the event a high-power interference source appears.

As is well known, adaptive antenna arrays for communication systems where the direction of arrival is not known generally have a pilot vector consisting of a weight of (1,0i) on a single omni reference element to turn the reference element on with no phase modulation and (0,0i) on all other elements to turn those elements off, where the complex numbers represent bipolar complex weights with a maximum value of one. These complex weights can adjust signals passing through array antenna elements in amplitude and phase to any point within a unit circle. The adaptive antenna array control system will maintain this pointing vector until other energy causes it to adjust the weights on both the reference and auxiliary antennas to minimize incoming power, generally by forming a point null in the direction of a strong interferer.

It is relatively simple to form a weight pilot vector to steer an antenna array toward a particular point in space where a desired signal is expected to originate in the relative spatial coordinate system. This is a matter of calculating the propagation path across the array from the direction of arrival and phasing all elements to add their reception vector in phase with the desired signal received in the reference element, normally at the array center. However, in the case where it is desired to form a null towards a particular point in space, the equivalent weight vector calculation to form such a null is not as simple as it is desired to have the reception from that direction total zero while not shutting the array down in all directions There have been many algorithms developed in the prior art to approach the theoretical steady state optimum weight, minimizing energy out of an adaptive system while trying to maintain gain in the direction of the pilot vector. The theoretical steady state optimum weight vector solution is given by the equation:

$$W=[R]^{-1}*P \qquad \text{Eq. [1]}$$

In this equation, W is the weight vector for all elements, [R] is the estimate of the integrated cross correlation matrix, or covariance matrix, of all elements in the presence of noise, and P is the pilot vector for steady state, non jammed reception. The [R] matrix would hold values descriptive of the samples of all elements in the array in the presence of the signals in space as they propagate across the array. Thus, a pilot vector P modified for a null in the direction of an interferer could be formed by placing the array in such an environment, adapting for a new weight vector W, and then freezing the weights to be used as the new pilot vector P. The adaptive process can thus be controlled by shaping the covariance matrix [R]. This approach is further described below in a method embodiment. It should be noted that the matrix inverse $[R]^{-1}$ is the most complex mathematical operation in this process, requiring the most steps and the most numerical precision.

The present disclosure provides a system and method for shaping a quiescent array pattern. According to a method embodiment, a process for shaping a quiescent array pattern is substantially equivalent to deriving a pilot vector that does not form a null on a single point in space, as practiced in the prior art and briefly described above and shown in equation 1, but operates instead by biasing the adaptive antenna array to shade a particular pre-determined region of space to have lower gain. In other words, in accordance with the method embodiment, regions of space are shaded (i.e., selectively biased) to have lower gain without concentrating on particular potential point sources of interference. Then, whenever a potential point source of interference appears, resources dedicated to the spatially shaded regions are adaptively reassigned as needed.

If an array were large enough and had sufficient degrees of freedom, an adaptive controller could weight the array such that an independent, deep null would be formed on each interferer angle of arrival. In the case where there are more interferers than degrees of freedom and they have angles of arrival too close to independently resolve with the array spacing, the adaptive controller advantageously compromises by adjusting the weights to minimize average power by forming weights that pull the whole region of interference down in gain but likely not forming a sharp null on any single interferer. This limitation of small arrays is used in the definition of the shaded regions by spreading a number of simulated low-power signals across the region to be shaded, too numerous to be individually attacked and nulled. Adaptive arrays use a power inversion principle so that the process directs its resources at the source of greatest energy. The extent of shading or bias is thus controlled by the total signal strength given the simulated signals as compared to the strength of signals encountered in the actual scenario of operation.

Referring now to the drawings, FIG. 1 is a block diagram illustrating a system for adaptively biasing an adaptive antenna array against reception from a particular spatial region as an element of an adaptive interference cancellation system, according to one embodiment. A system of the invention comprises a cancellation circuit 100 for eliminating both high power interference and biasing against regions of suspected low level interference.

It should be appreciated that the present exemplary embodiment is directed to a communications application; however, this is described only by way of example and not limitation.

The antenna array 120 shown consists of a number of antenna elements capable of reception in the band of interest. Five elements are shown for ease of explanation. These antenna elements 120 may be similar or dissimilar in pattern types but should be well characterized in their array positions. They provide RF analog output to the digital receivers 130 which sample and digitize the time-varying element received signals in accordance with well-known Nyquist sampling rules. These digitized time-varying element received signals 135 are simultaneously fed to both the digital weight and summation module 140 and the adaptive processing module 180. The adaptive processing module 180 computes the adaptive weights based upon the current interference scenario in which the system is operating while the digital weight and summation module 140 applies those weights to the data from the current scenario.

As briefly described above, the adaptive processing module 180 receives as input the time-varying samples of total receive signal complex scalars from each element and provides as output updated weight values. System processor 184 is specified such that weight updates occur with a frequency to meet platform dynamics, allowing the nulls to track the interference signal direction of arrival. In one embodiment, Adaptive processing module 180 is comprised of three sub-modules, namely, a Covariance Matrix Formation module 181, an Array Biasing Covariance Matrix module 182, and a Weight Vector Calculation module 183. The three modules are implemented as executable code, generally labeled 185 for performing the functions associated with the Adaptive Processing module 180. The Covariance Matrix Formation module 181 uses the element received signal streams 135 as input to form a time-averaged covariance matrix as output for the current scenario.

It should be understood that the Array Biasing Covariance Matrix is an approximation of the well-known scenario covariance matrix assuming no stochastic noise is present. This approximation is reasonable as the model is constructing the signals from pure signal tones and this matrix will not be inverted by itself, causing numerical accuracy problems, but will be added to the current interference scenario covariance matrix, that will have thermal and environmental noise, before inversion. The Current Scenario Covariance Matrix approximation, to which the Array Biasing Covariance Matrix is to be added, is formed by the filtering of independent scenario samples and averaging these samples. It should be appreciated that the number of samples averaged is always a compromise between longer intervals to minimize residual noise and shorter intervals to improve system response time to changing scenarios.

A key aspect of the present invention is combining a simulated environment, via the array biasing covariance matrix, with a real-time environment, via the time-varying current scenario covariance matrix, in an adaptive control process by embedding a model of the system for the purpose of creating an artificial influence on the adaptive solution into the actual system process. A standard adaptive process controller, in accordance with the prior art, would compile its real-time approximation of the covariance matrix and then calculate the next weight update. An adaptive model, according to the prior art, similarly compiles its covariance matrix based upon the scenario provided to the model and then solves for the weight update. In contrast with these prior art approaches, the present invention combines a simulated environment with a real-time environment during a step of composing a covariance matrix by adding two independent matrices, representative, of the simulated and real-time environment, respectively. The system's performance will be limited to the precision with which the model represents the system so effort must be made to incorporate implementation details such as antenna element factor (gain and phase variation with angle of arrival) within the model.

Figure 2:
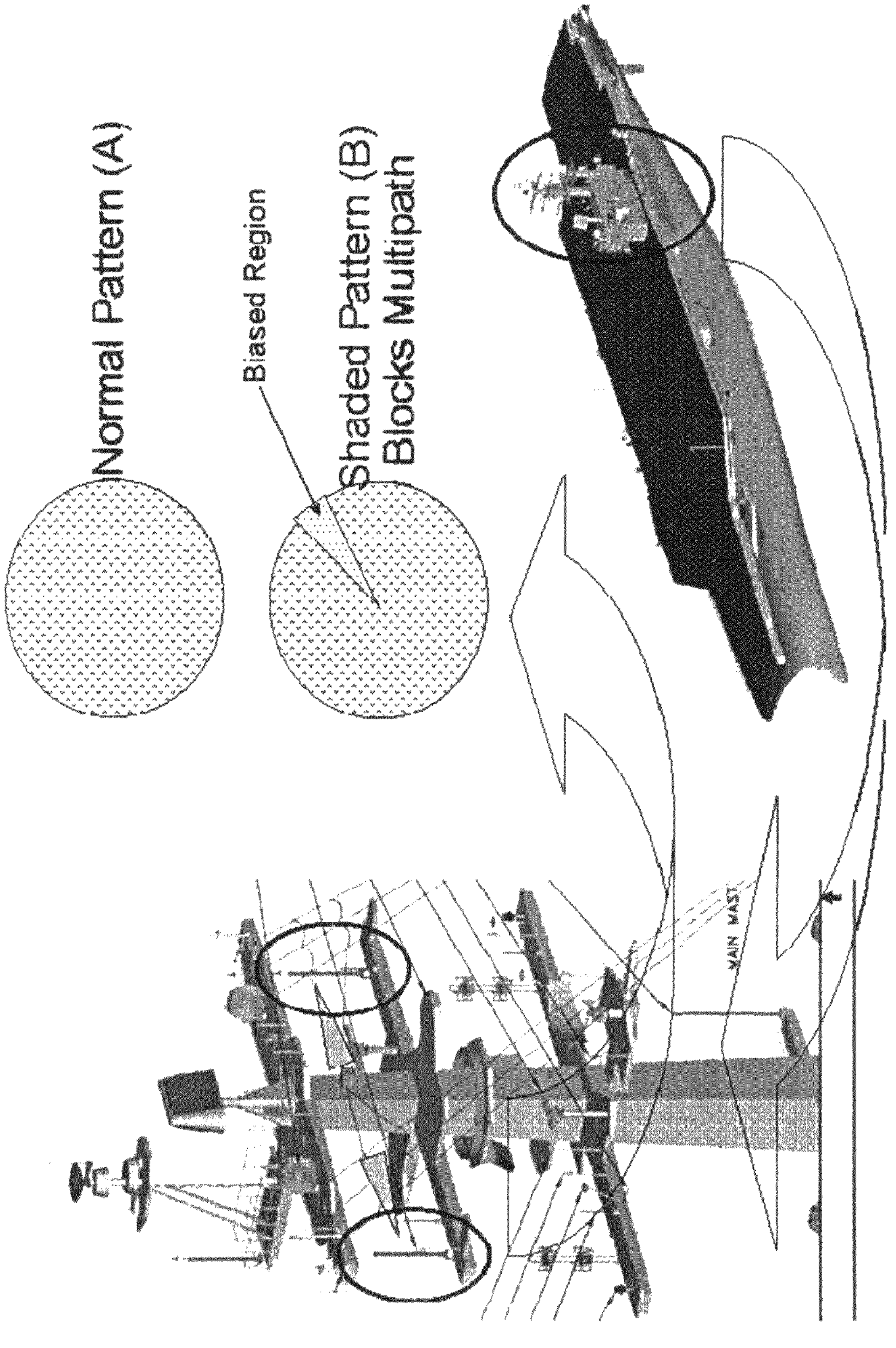
FIG. 2 illustrates the array shading of the improved adaptive antenna array interference cancellation system as used in a fixed installation with regional multipath interference.

FIG. 2 illustrates an exemplary implementation utilizing a system of the present disclosure for adaptively biasing an adaptive antenna array against reception from a particular spatial region as an element of an adaptive interference cancellation system. In the exemplary implementation, a biased region is held constant relative to the array on a fixed installation, to protect the system receiver from undesirous multipath off a fixed metal structure (e.g., the mast). As stated above, the biased region represents a particular pre-determined spatial region identified to the system as an area of potential low-level interference. A so-called "biased region" is defined herein as a region having a reduced array gain relative to the remaining shaded pattern. See pattern B of FIG. 2. This is in contrast with the prior art approach of having equal reception in all areas. See pattern A of FIG. 2.

Figure 3:
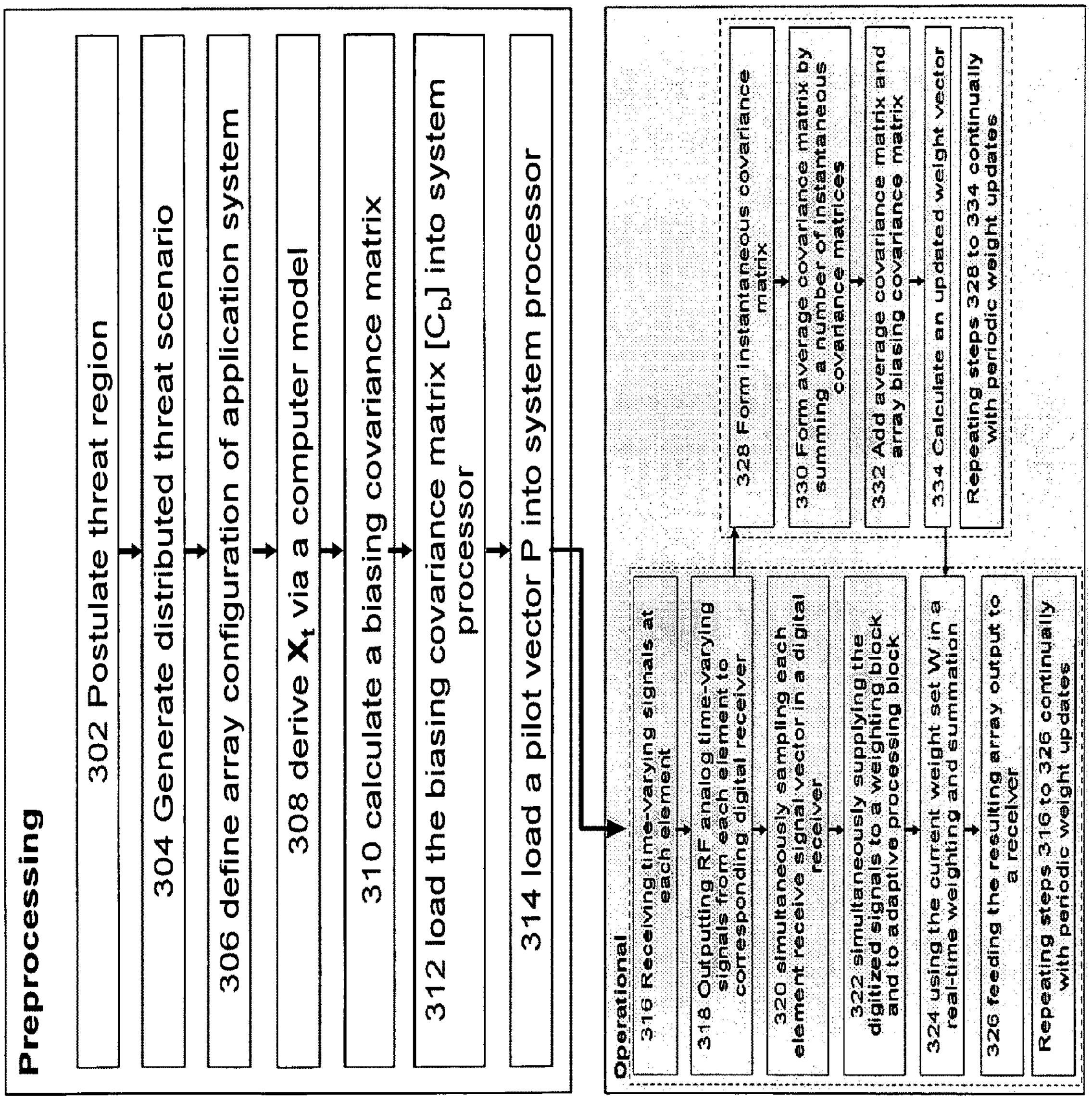
FIG. 3 illustrates the processing flow of the improved adaptive antenna array interference cancellation system.

FIG. 3 is a top-level flowchart of the method embodiment for providing a biasing of the array factor of the adaptive array system of the present invention. The method generally comprising eliminating both high-power interference and biasing against regions of suspected low level interference.

[A.] In a Pre-Processing or Configuration Stage:

At step 302, postulating a threat region in angle of arrival, where low-power level interference is likely to originate.

At step 304, generate bias region information consisting of a scenario of low power and equi-power signals distributed across the postulated threat region, established at step 302.

At step 306, define array configuration of application system.

At step 308, derive, via a computer program generating a signal model and using array configuration in both spatial location and element factor to facilitate the calculation, received signal vectors at each element of the adaptive array due to each threat signal.

At step 310, calculate a biasing covariance matrix $[C_b]$ from the modeled received signal vector. With reference again to FIG. 1, the Array Biasing Covariance Matrix can be generated before system installation (i.e., at the pre-processing or configuration stage) for the fixed scenario system but will be built within the system for dynamic scenarios. Subsequent to it being generated by a computer program executed on an external processor, it is loaded into the Adaptive Processing module 180 and stored in the Array Biasing Covariance Matrix module 182. The adaptive processing control 180 utilizes the stored Array Biasing Covariance Matrix in the weight vector calculation module 183. The weight vector calculation is the solution of a group of simultaneous equations to provide minimum energy out with the constraint of a pilot vector P. It solves the simultaneous equations for the adapted weights using both the actual, current, real-time scenario covariance matrix and the array biasing covariance matrix so that the processor 184 continually allocates the resources depending on both perceived threats of low-power interferers from the shaded regions and the high power threats of the current scenario.

At step 312, load the biasing covariance matrix $[C_b]$ into an adaptive processor 184 of the adaptive array system where it is stored and recalled as needed;

At step 314, load a pilot vector P as the array quiescent steering vector of the standard system. This may be steering the array as an omni receive system or with a point direction for the data link.

The preprocessing steps described above uses bias region information as input for an intended system application to generate a bias covariance matrix of a simulated interference environment, as described below. The bias covariance matrix is added into a time-varying operational covariance matrix during system operation. This bias covariance matrix and the pilot vector thus become the system inputs to control the system in operation.

[B.] At an Operational Stage:

At step 316, periodically receiving at a plurality of antenna elements of an adaptive array system, time-varying signals received in a band of interest. The input signals are RF frequency signals, either desired or interfering, as summed together at the receiving elements in space.

At step 318, outputting RF analog time-varying signals as output from each of the plurality of antenna elements and forwarding the RF analog time-varying signals to a corresponding plurality of digital receivers 130.

At step 320, simultaneously sampling from each antenna element, a signal vector received via a digital receiver, composed of inphase and quadrature complex scalar, at a data rate sufficient to meet Nyquist bandwidth sampling rules and outputting digitized time-varying signals.

At step 322, simultaneously supplying the digitized time-varying digital signals, output at step 320, to a digital weight and summation module 140 and to an adaptive processing module 180.

At step 324, using the current weight set W, a complex vector, to multiply the associated antennas time samples, $X_t$, a complex vector, in a real-time weighting and summation to form an array output time sample, via a vector, vector product yielding a complex scalar. The value of W is the initial pilot vector with no outside signal energy and no bias matrix. In accordance with invention principles, the bias matrix influences the weight calculation to shade the desired region. Upon the introduction of one or more threats, as represented by external energy, the current interfering scenario covariance matrix accounts for the threat by influencing the calculation of the current weight set W.

At step 326, outputting the system array output time sample to a system receiver, the serial string of which allow signal demodulation and usage.

It is noted that steps 328 through 334, below, are performed in parallel with steps 316 through 326, above, however, step 328 begins after step 322 above.

At step 328, forming an instantaneous covariance matrix in the adaptive processing module 180, using the digitized time-varying digital signals, generated at step 322, as input.

At step 330, summing together a group of instantaneous covariance matrices from time t to time t−nT, where n is sufficiently large, twice the number of elements for example, to filter out thermal noise and T is large enough to make samples independent relative to Nyquist sampling rate, five percent of Nyquist for example, to form a current scenario time-averaged covariance matrix $[C_c]$.

At step 332, adding the two matrices. More particularly, adding the current scenario covariance matrix $[C_c]$, generated at step 330 and the array biasing covariance matrix $[C_b]$, generated at step 310, to form a total system covariance matrix [R].

At step 334, calculating a new, updated weight vector W by equation $W=[R]^{-1}*P$, that is then applied at step 324.

Repeating steps 328 to 334 continually.

Figure 4:
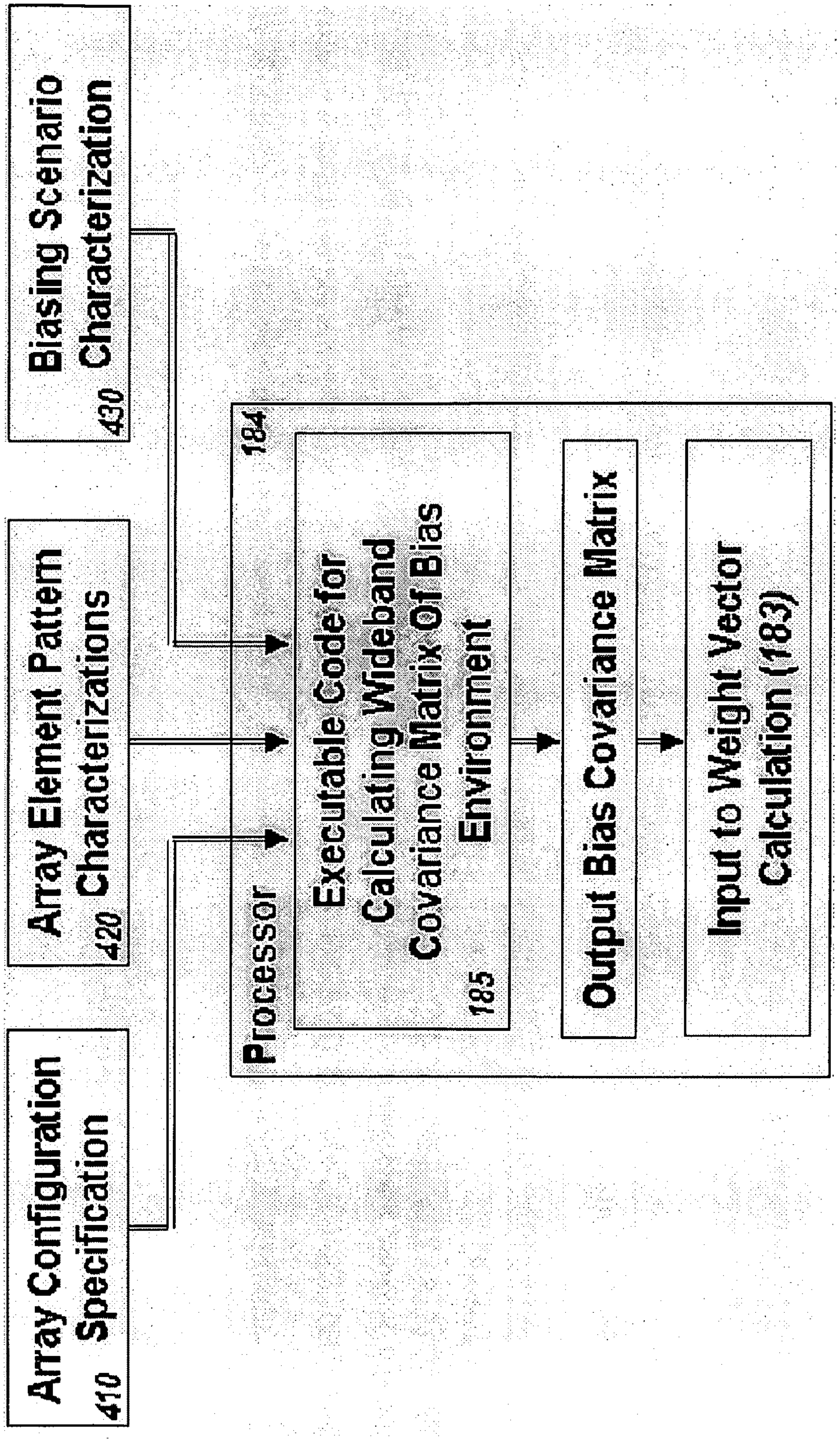
FIG. 4 is a flowchart for illustrating the major inputs to a wideband model simulating an interference scenario used in the Array Biasing Covariance Matrix Formation module.

FIG. 4 is a block diagram of a process for executing code to generate a computer model of a simulated bias covariance matrix to drive an adaptive antenna array. The generated computer model simulates the field pattern of an adaptive antenna array for any desired simulated threat scenario. The computer model generates, as output, the Array Biasing Covariance Matrix.

A computer program for generating the computer model is comprised of computer code executable on any conventional processor whose speed and capacity are sufficient to meet scenario dynamics of a particular system application. In some embodiments, the computer program may be executed on any conventional processor external to the system. In other embodiments, the computer program may be executed internal to the system and run on an internal system processor 184 within the Adaptive Processing module 180, as shown in FIG. 1 and FIG. 4. Irrespective of the location of the processor, the computer program generates a computer model of a simulated Array Biasing Covariance Matrix to direct the elements of the adaptive array for a pre-programmed artificial threat scenario composed of a large number of signals distributed over the area of theorized potential threat.

As shown in FIG. 4, in one embodiment, the computer model is provided with three inputs, namely, a first input comprising an array configuration specification 410, a second input comprising array element pattern characterizations 420, and a third input comprising bias region information of an imaginary scenario characterization 430. Each of the respective inputs are described as follows.

Array Configuration Characterizations and Specification Inputs

The array configuration specification 410 and pattern characterizations 420 fare required to correspond with the system application configuration for model accuracy. These include the location (x, y, z, roll, pitch, yaw), of each element in the array and the element phase and amplitude sensitivity for each relative arrival angle.

Biasing Scenario Input Information 430

The biasing scenario information 430 is a field of equal power sources spread over the region to be shaded directed to implementing the bias in the adaptive process of the present disclosure.

The computer model uses the three inputs defined above, describing characteristics of the array and elements being used in the system and the artificial threat scenario of a biasing distributed interference scenario to create a "bias region" based on a pre-programmed artificial threat scenario. These three inputs are then further collectively used by the computer model to calculate the relative signal vectors received in each array element by techniques well known to those knowledgeable in the art.

The Array Biasing Covariance Matrix, output from the computer model, is combined with the system's time-varying current Covariance Matrix to form an adaptive solution to bias the adaptive array in a quiescent state but is flexible enough to allow the adaptive array's resources to be reassigned, in real-time, when high power interferers appear.

In one embodiment, the system can be programmed with model input data (for a system with an internal model). This system can then respond to changes in a current real-world interference scenario as supplied by other system inputs such as in a dynamic platform with off-platform, low level interference threat. Off-platform refers to any source not fixed on the platform and thus moving with the antenna array in a fixed relative position. In other embodiments, the system can be programmed with model output data (for a system without an internal model) in the form of the Array Biasing Covariance Matrix or a biased pilot vector $P_b$. This latter system, according to the presently described embodiment, lacks the ability to change with a changing interference scenario, such as relative platform orientation or position, but is simpler to build and field, and is applicable to on-platform, low level interfering region, using the output data of the model in the system implementation. Another embodiment discussed below, addresses the situation where the bias region is off-platform and must consider relative platform position and orientation.

Referring again to FIG. 1, the computer model calculates the wideband covariance matrix of the bias environment in module 182 of FIG. 1. This module 182 performs a number of functions including, generating a wide-band propagation model of a biasing scenario, extrapolating individual sine waves across the array to generate total received signal vectors at each element in time, generating a covariance matrix from this biasing scenario, and then storing the covariance matrix as the array biasing covariance matrix.

It should be understood that while modeling adaptive antenna array systems is well known, the method of the invention, unlike known methods, uses a well known wideband propagation model to generate a novel independent covariance matrix for the biasing scenario. This is advantageous and represents an advancement in the art in that the independent covariance matrix for the biasing scenario can be directly combined with the time-varying current interference covariance matrix in the real-time solution such that common resources can be used to protect against the potential low-level interferers of the bias region and the real time higher power interferers as they occur in the system mission. Prior art solutions do not provide a flexible approach that dynamically addresses both low-level and high-level interferers in real-time.

The bias region information, either created by the user or incorporated into the model code process, consists of a large number of low-power interferers scattered over the area of potential threat. The system user establishes a scenario for the biasing environment used by the model by generating a field of low-power signal sources evenly spaced across the region of threat. The total power level of these sources in the model also sets the relative priority of the biasing to the active interfering sources received in the adaptive process. This priority can also be adjusted by weighting or multiplying the array biasing covariance matrix before combining with the time-varying current scenario covariance matrix. Each signal is modeled as a number of sine waves in frequency scattered across the system bandwidth to achieve a broad band model. Their relative angles of arrival are used to calculate the signal vector received at each element with consideration to its array position, element factor in the direction of arrival, and signal strength. All frequency signal components from all signals are summed to develop the element signal vector, as if it were an actual element in the biasing scenario environment. The element vectors are used to form the covariance matrix for the biasing scenario just as was done for the time-varying current scenario covariance matrix formation except that there is no averaging, as described in the flowchart of FIG. 5:

Formation of the Modeled Array Biasing Covariance Matrix

Figure 5:
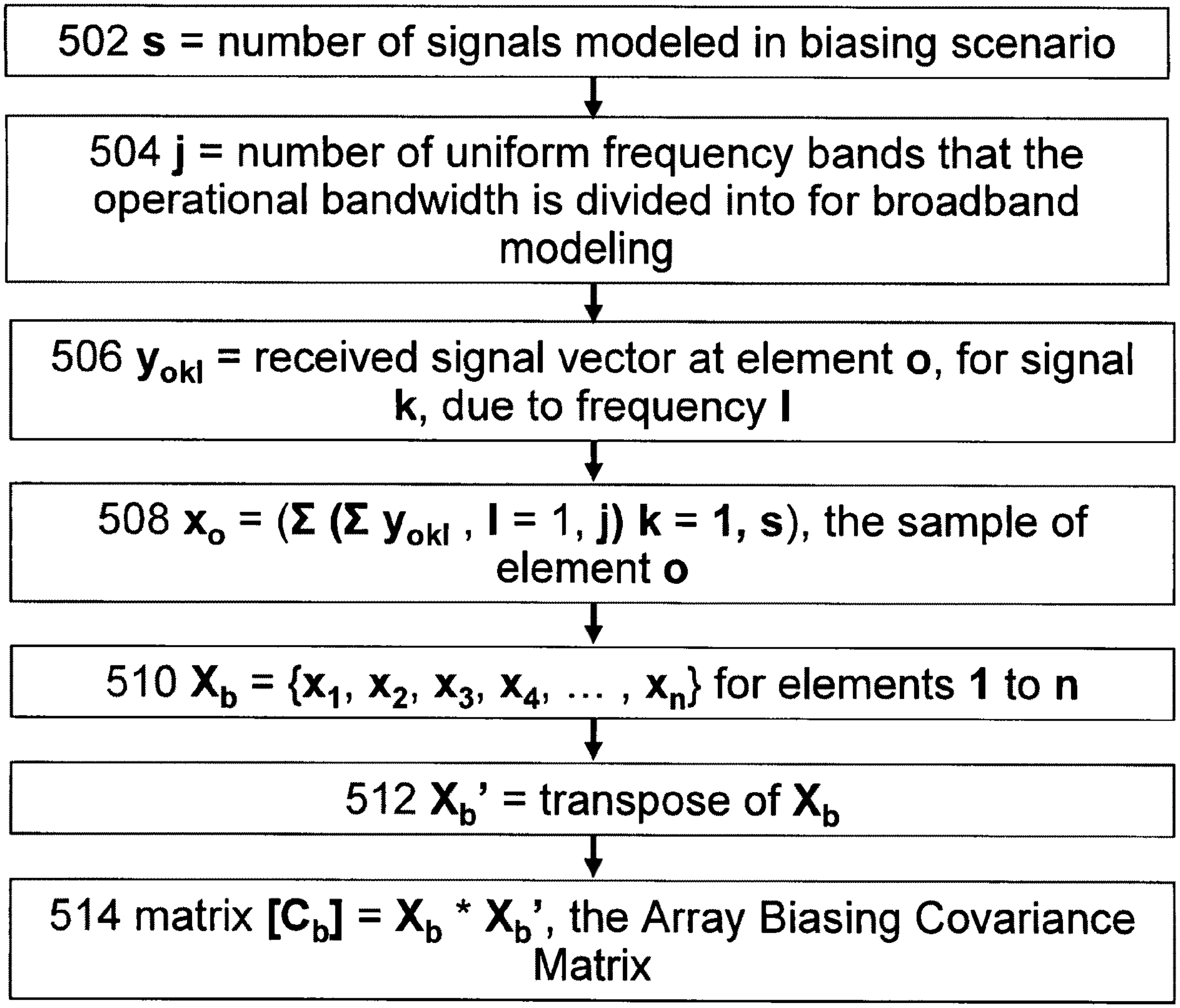
FIG. 5 is a flowchart for illustrating the processing steps to form the Array Biasing Covariance Matrix in the wideband model module.

Referring now to FIG. 5, which is a more detailed flowchart of a method embodiment in accordance with step 310 of FIG. 3. As stated above, the biasing covariance matrix is generated as output from a computer program executed on processor 184 and is provided as input to the weight calculation process.

At step 502, the number of signals "s" modeled in biasing scenario is defined.

At step 504, the number of uniform frequency bands "j" that the operational bandwidth is divided into for broadband modeling is defined. The band of operation is divided into "j" equal bands and then an individual frequency within each band is selected by random number. These "j" sine wave tones then represent the broadband signal in space with a random phase at array phase center.

At step 506, the received signal (I,Q) complex scalar at element o, for signal k, due to frequency l, is defined as $y_{okl}$. The sine wave tones are thus calculated as it propagates at the speed of light across the array for each tone of each signal for its arrival angle as received by each element as "l" goes from one to "j", the number of tones comprising each signal, as "k" goes from one to "s", the number of signals, and as "o" goes from one to "n", the number of elements.

At step 508, a complex (I,Q) scalar $X_o$ is formed for array elements 1 to n using complex (I,Q) scalars for each element as individual tone scalars are added.

At step 510, the vector X is formed for antenna array elements 1 to n.

At step 512, a transpose vector $X_b'$ is formed from $X_b$.

At step 514, the complex matrix $C_b$ is computed from the vectors X and X'.

Figure 6:
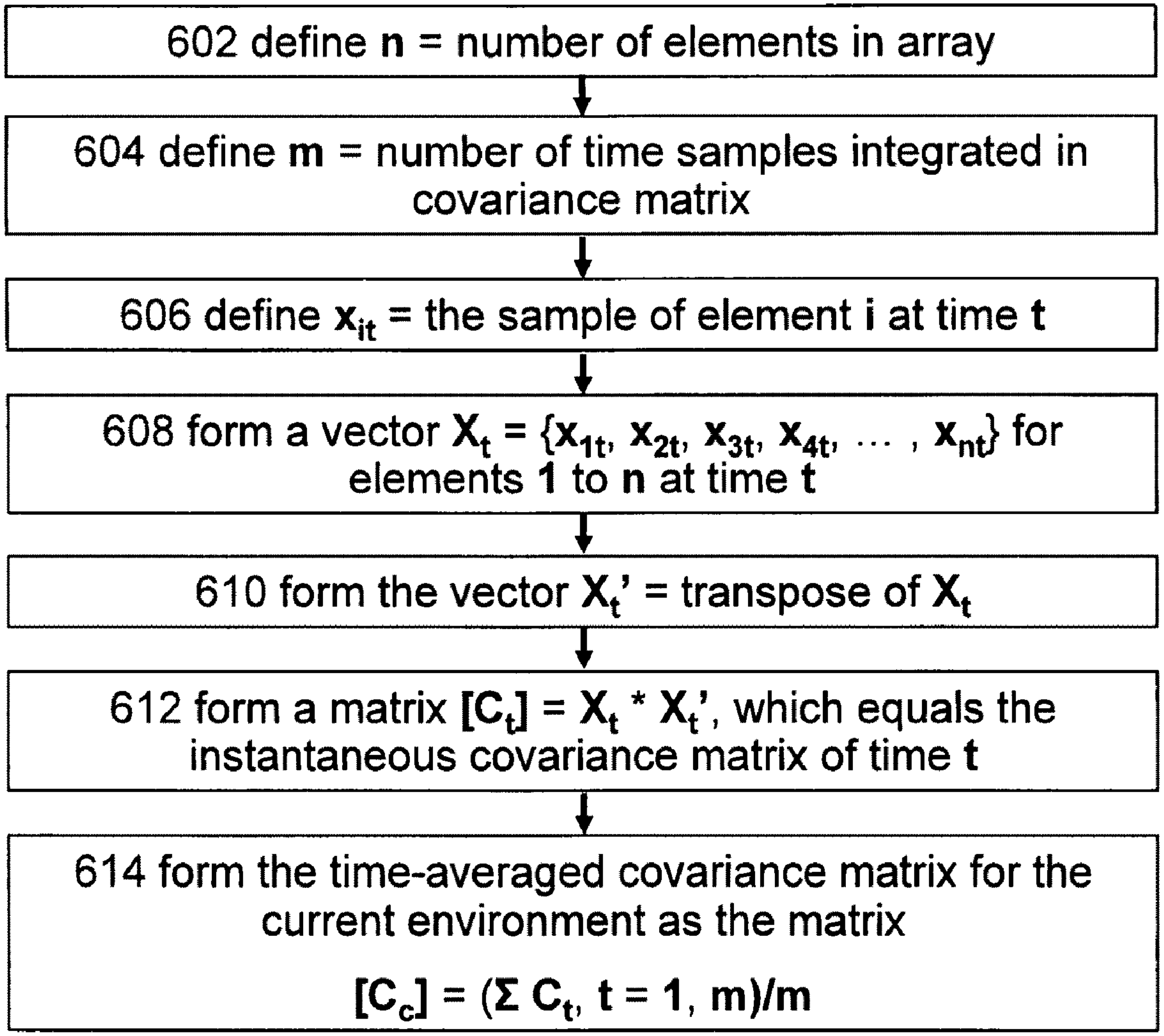
FIG. 6 illustrates the processing steps of Covariance Matrix Formation module 181.

Referring now to FIG. 6, which is a more detailed flowchart of a method embodiment in accordance with step 330 of FIG. 3.

Formation of the Covariance Matrix

At step 602, the number of elements "n" in an adaptive antenna array is defined. By way of example, consider an adaptive antenna array comprised of 5 antenna elements.

At step 604, the number of time samples, "m", of the instantaneous covariance matrix to be integrated into the covariance matrix is defined. This smoothing is to eliminate noise in modulation of the weights, thus increasing the desired integration number, but too large of a number slows the process in a highly dynamic situation, requiring balance in number selection.

At step 606, a complex scalar sample of array element "i" at time "t" is defined as $X_{it}$.

At step 608, a complex vector $X_t$ is formed for array elements 1 to n at time t using synchronous complex (I,Q) samples from each element.

At step 610, a transpose vector $X_t'$ is formed from $X_t$.

At step 612, the complex matrix $C_t$ is formed as the instantaneous covariance matrix of element samples $X_t$.

At step 614, the time-averaged covariance matrix $C_c$ is formed utilizing the complex matrix $C_t$. It should be appreciated that although signal processing for receiver message demodulation must meet the Nyquist criteria, sampling for covariance processing does not have this requirement. In fact, sampling for covariance processing to meet the Nyquist criteria is a waste of processing power. The time-varying current scenario covariance matrix $[C_c]$ is thus formed from m instantaneous covariance matrices $[C_t]$ as follows:

$$[C_c]=(\Sigma C_t, t=t_0, t_0-mT)/m \qquad \text{Eq. [2]}$$

where T is sufficient to make matrices $[C_t]$ independent or incoherent relative to signal bandwidth.

Figure 7:
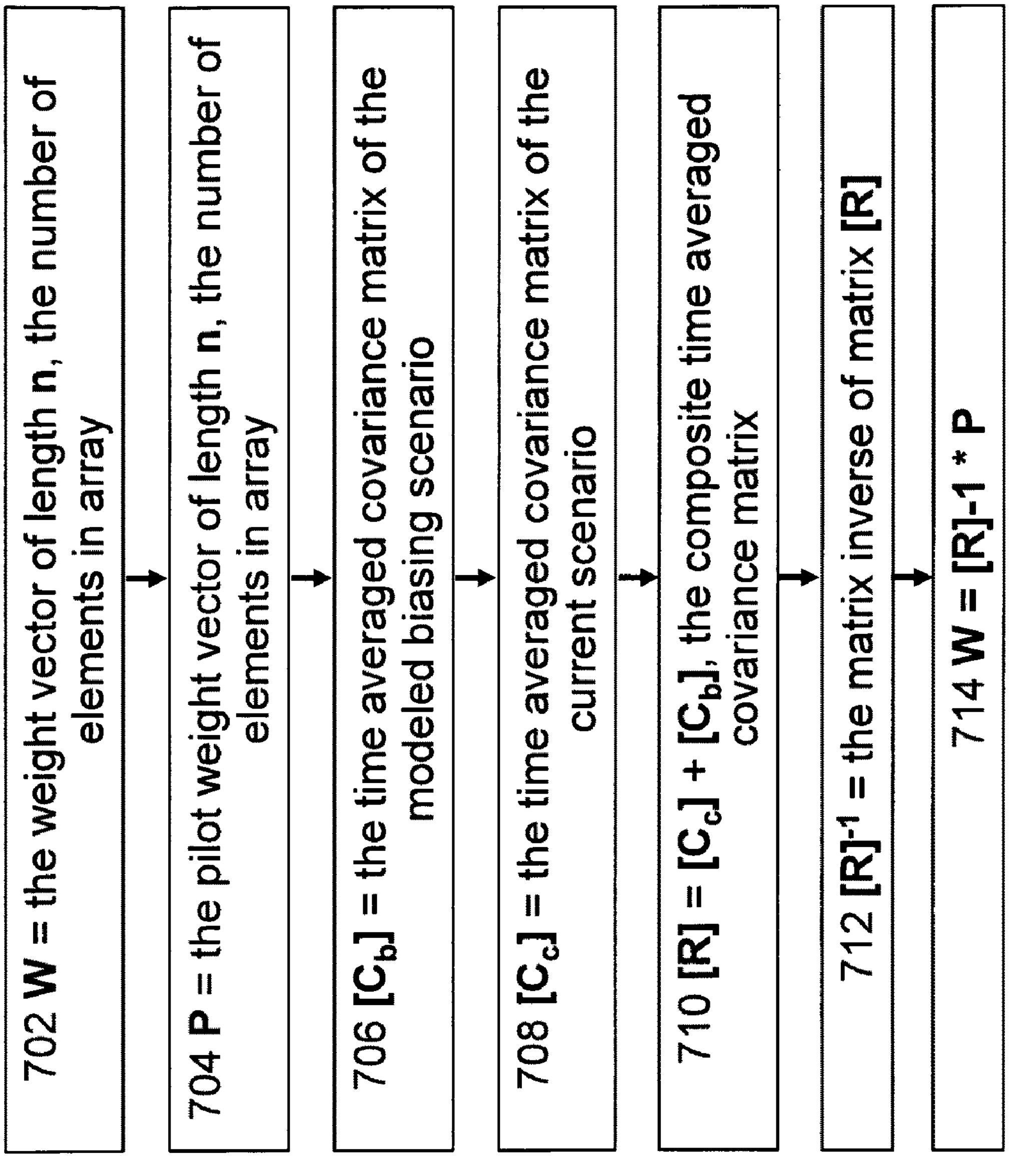
FIG. 7 is a flowchart for illustrating the processing steps for performing Weight Vector Calculation in the Weight Vector Calculation module.

Referring now to FIG. 7, which is a more detailed flowchart of a method embodiment in accordance with step 336 of FIG. 3.

At step 702, a weight vector "W" of length n is defined as a complex vector representing complex weights (Inphase, Quadrature) multipliers of complex digital signals (I,Q) from each of the elements in the array.

At step 704, a pilot weight vector "P" of length "n" is defined as the quiescent complex weight vector of elements in the array.

At step 706, a covariance matrix $C_b$ is defined as covariance matrix calculated from the modeled biasing scenario.

At step 708, a time-averaged covariance matrix $C_c$ is defined as covariance matrix of the current scenario.

At step 710, the composite time averaged covariance matrix [R] is formed from the sum of individual covariance matrices $[C_c]$ and $[C_b]$.

At step 712, the matrix [R] is inverted to form the matrix $[R]^{-1}$.

At step 714, the new adapted weight W is formed from the product of the inverted covariance matrix and the pilot vector.

$[C_c]$ is time varying as the scenario changes while $[C_b]$ is a constant, in this embodiment. The weight vector calculation 183 adds these two matrices together before making the calculations of equation 1 to calculate the adapted weights W to be used for adaptive control of the array. When the pilot vector P is constant as in omni, upper hemispheric reception, and the bias region is constant relative to the array, the solution of equation [1] using just the biasing covariance matrix could provide a new fixed pilot vector, $P_b$, making it unnecessary to add the two covariance matrices, namely $[C_c]$ and $[C_b]$, on each weight update. Thus, when P is a constant and array biasing covariance matrix $[C_b]$ is a constant, a new $P_b$ can be used as the steady state quiescent pilot weight, eliminating the need for the repeated matrix update of $C_c$ with $C_b$. If the Pilot vector is steering toward a known transmitter location, such as the GPS satellite being tracked by the protected receiver, the pilot would have to be continually updated but independent of the biasing covariance matrix so it is more efficient to add the biasing covariance matrix to the element time-averaged covariance matrix before inversion.

The weights are applied to the element received signal 135 data streams in the digital weight and summation module 140 which forms the adapted output 145, the protected output data stream used by the protected receiver(s) 150.

As described above and illustrated in the figures, a system of the present disclosure is pre-programmed to adaptively bias an adaptive antenna array against reception from unwanted interference in a particular direction (i.e., pattern B as shown in FIG. 2). To adaptively bias the adaptive antenna array, a scenario model is generated, by the computer model, to simulate the antenna array bias against reception from unwanted interference in a particular direction. Generating a computer model generally comprises executing a computer program to simulate a desired interference scenario with the system antenna array configuration. The desired interference scenario requires providing input data comprised of (1) interferer source data, (2) relative location data, and (3) power data. Using these three inputs, the interference scenario is modeled. In different embodiments, modeling may be performed either internally or externally from an internal system processor. An output of the computer modeling process is an Array Biasing Covariance Matrix.

In an embodiment where the Array Biasing Covariance Matrix is modeled externally, the output of the computer model (i.e., the covariance matrix values) are provided to the system to be added to a real-time Covariance Matrix as it changes and is updated in normal system functioning as the interference signal environment changes. The array biasing covariance matrix is used together with the real-time covariance matrix to calculate new weight vectors for each antenna array element whereby the weight vectors apply the intended antenna bias against low level and high level threats.

The pilot vector is the initial array steering vector for the system, either creating a near-omni pattern or steering toward the desired signal direction. The system has been described for an implementation where the pilot vector is used in every weight update calculation, allowing it to continually change, as if the desired signal were being tracked and the array were continually steered toward it. The low-level threat region has been allowed to vary relative to the array so that the Array Biasing Covariance Matrix was continually changing and being updated for the weight calculation. If both the pilot vector and the Array Biasing Covariance Matrix are constant, then a new biased pilot vector, $P_b$, can be loaded and used to reduce processing. The pilot vector P is constant for most communication systems where the data link signal can arrive from any direction so that the pilot vector generates a near-omni pattern. The Array Biasing Covariance Matrix is constant if the shading region is platform dependent and fixed such as the communications mast onboard ship. Array resources, that are normally not utilized in a quiescent state, are advantageously applied to reduce the normal gain in the direction of the mast (i.e., the fixed metal structure) when other interference is not present. Then, whenever one or more high-power interferers are detected, the resources can be re-allocated to address the high-power interferers as they appear. This process of re-allocating resources occurs seamlessly to a user.

Figure 8:
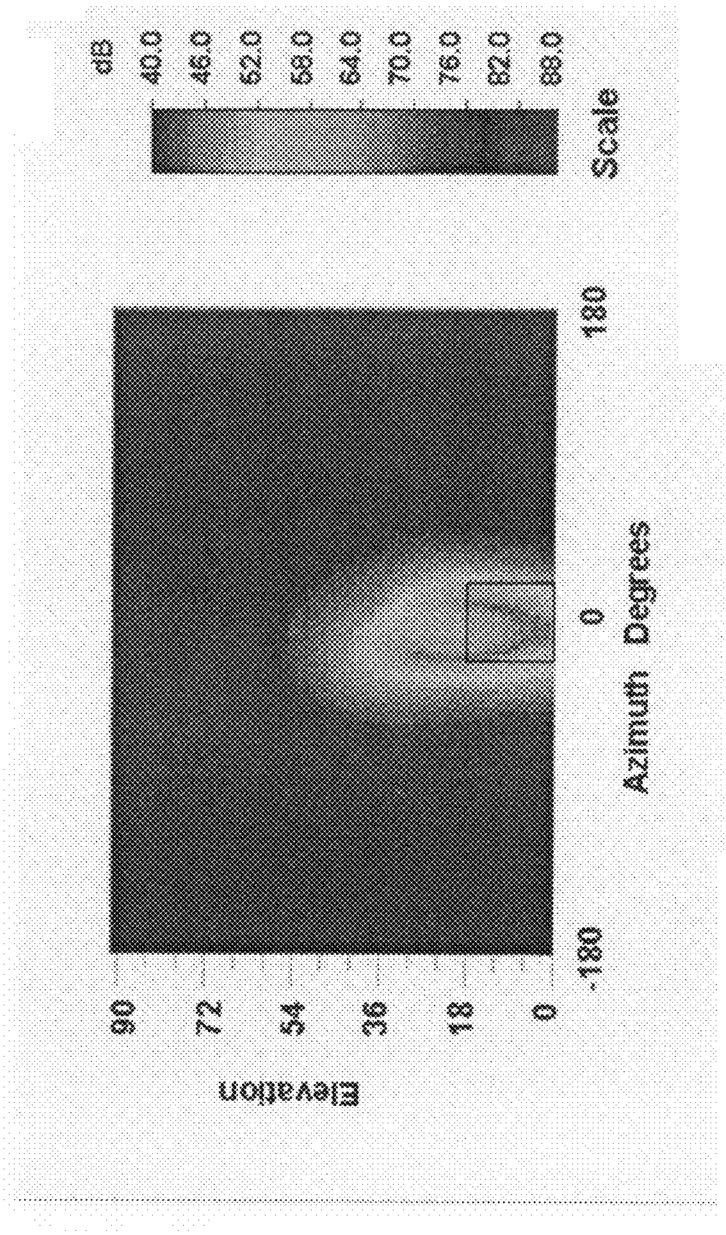
FIG. 8 illustrates an exemplary adaptive pattern of an adaptive antenna array system with a biased region representing a narrow multipath source region and no other interference threat present.

FIG. 8 shows, by way of example, a plot of spatial antenna coverage over the upper hemisphere of an adapted antenna array in noise to signal ratio (N/S) for a low-power satellite signal received at that relative azimuth and elevation angle. N/S is portrayed in color such that the red areas have high gain and the other colors show reduced gain. The bias region was specified as −15° to +15° azimuth and 0° to 15° elevation. This plot shows that the system effected a biasing of >20 dB over the region of interest.

Figure 9:
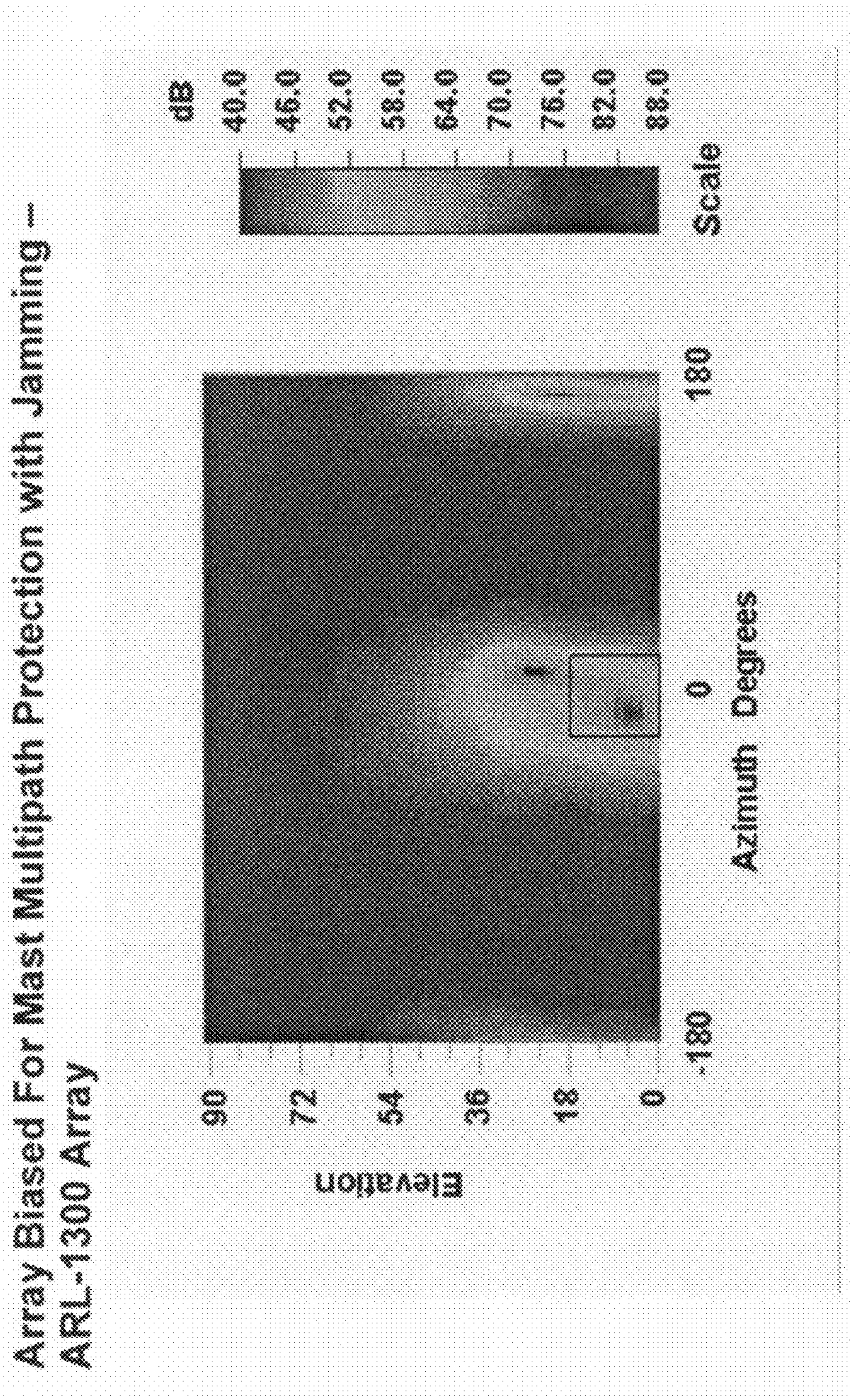
FIG. 9 illustrates an exemplary adaptive pattern of an adaptive antenna array system with a biased region representing a narrow multipath source region and an interference threat present.

FIG. 9 shows, by way of example, a plot of spatial antenna coverage over the upper hemisphere of an adapted antenna array where the bias region was again specified as −15° to +15° azimuth and 0° to 15° elevation but a strong interferer was added at 170° azimuth. This plot shows that the biasing is perturbed some over the region of interest while some resources are allocated to attack the strong interferer.

Figure 10:
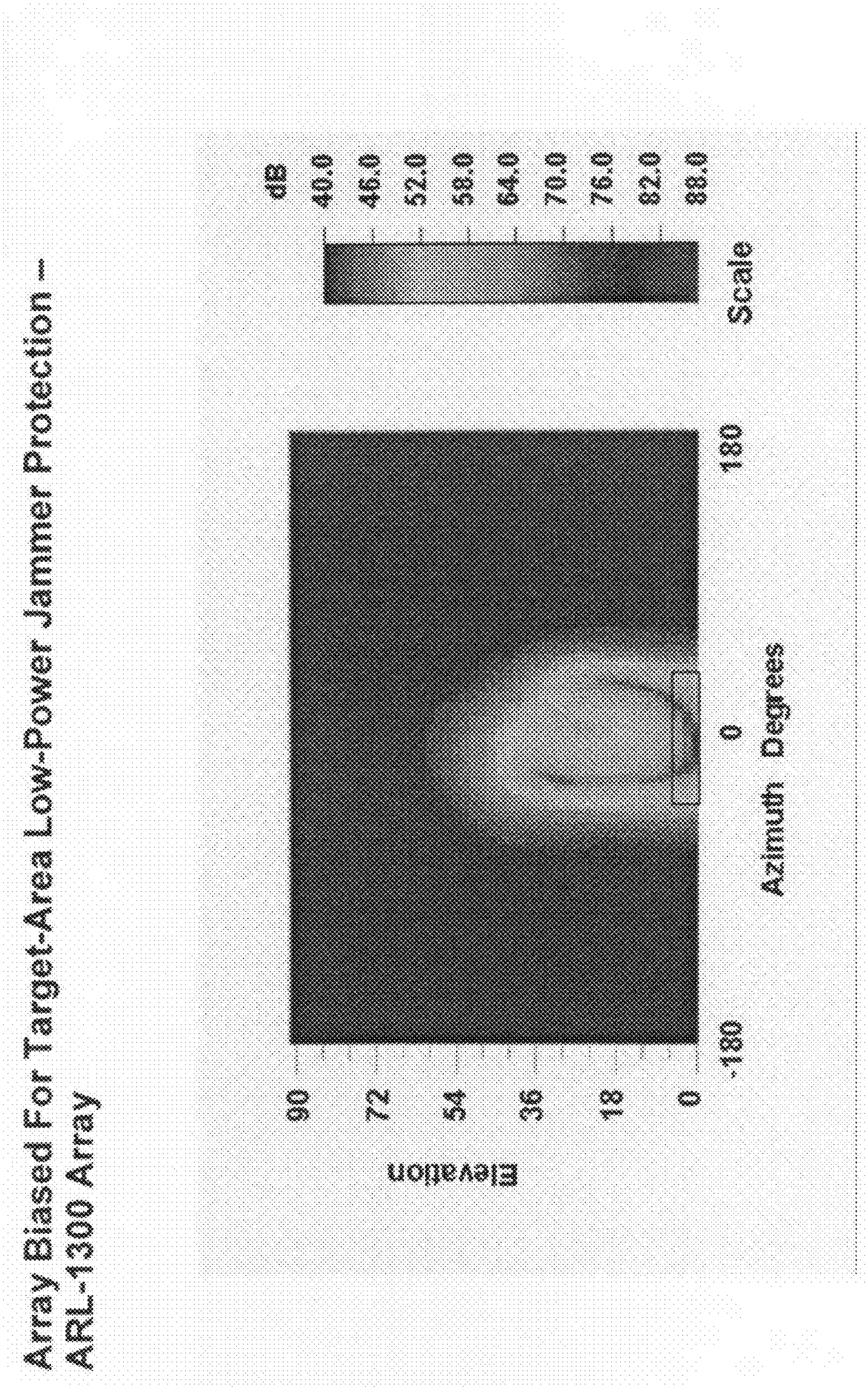
FIG. 10 illustrates an exemplary adaptive pattern of an adaptive antenna array system with a biased region representing an area of potential low-level jamming and no other interference threat present.

FIG. 10 shows, by way of example, a plot of spatial antenna coverage over the upper hemisphere of an adapted antenna array where the bias region was specified as −30° to +30° azimuth and 0° to 5° elevation. This plot shows that the biasing effected a shading of >20 dB over the region of interest.

Figure 11:
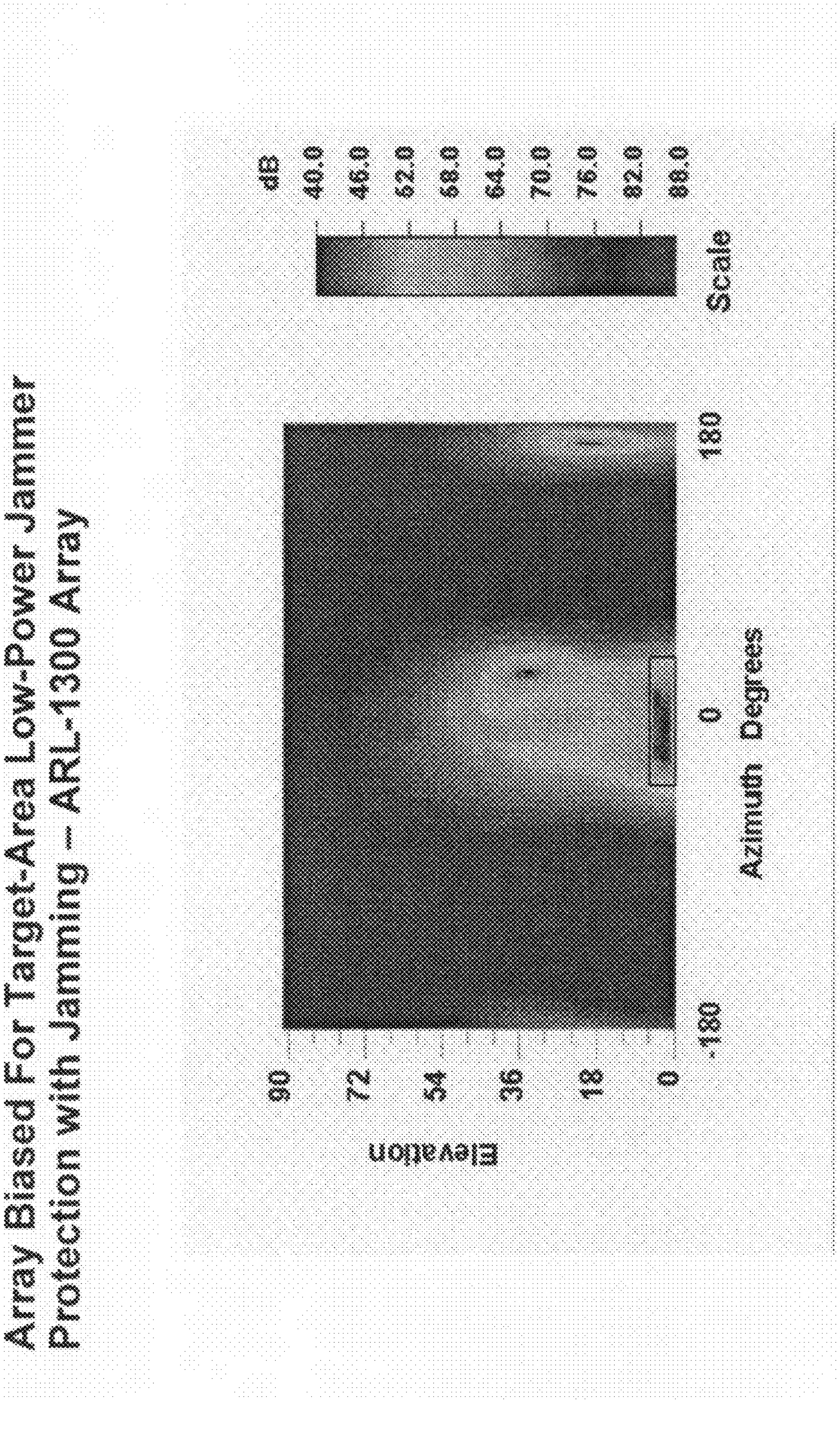
FIG. 11 illustrates an exemplary adaptive pattern of an adaptive antenna array system with a biased region representing an area of potential low-level jamming and an interference threat present.

FIG. 11 shows, by way of example, a plot of spatial antenna coverage over the upper hemisphere of an adapted antenna array where the bias region was again specified as −30° to +30° azimuth and 0° to 5° elevation but a strong interferer was added at 170° azimuth. This plot shows that the biasing is perturbed some over the region of interest while some resources are allocated to attack the strong interferer.

It is noted that each scenario of FIGS. 8-11 had sufficient degrees of freedom to maintain some biasing in the presence of a single strong interference signal. As the number of strong interference signals increased in a scenario, the number of degrees of freedom assigned to the biasing would be decreased until no resources were allocated to the purpose.

Figure 12:
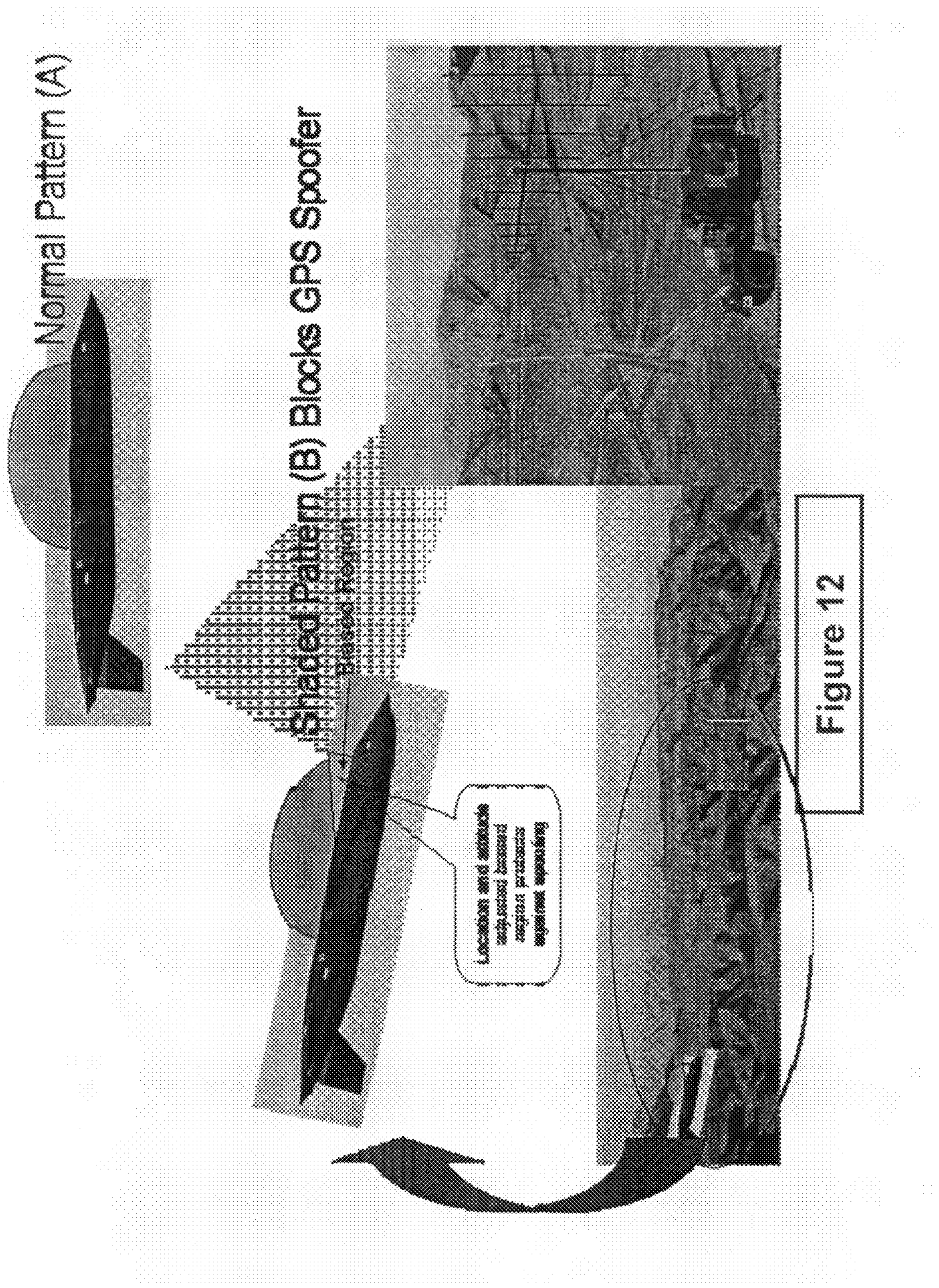
FIG. 12 illustrates the array biasing as used in a dynamic installation with regional threat of low level interference.

FIG. 12 illustrates, by way of example, the array biasing as used in a dynamic installation scenario with regional threat of low level interference. The bias region is time varying on a moving platform and the threat region may be a physical region on the ground, continually changing relative to the array during flight of the moving platform.

FIG. 13 is a module diagram illustrating an improved adaptive antenna array interference cancellation circuit 100 for eliminating both high power interference and biasing against regions of suspected low level interference as modified for a moving platform, according to one embodiment.

The presently described system contrasts with the system described above, as illustrated in FIG. 1, in that the previously described system assumed that the antenna array and the interfering regions were physically constrained relative to each other so that the array biasing covariance matrix was a constant. However, this constraint is removed in the case where the interference region is off the platform, as illustrated in FIG. 12 and described as follows.

With reference to FIG. 12, a system according to the presently described embodiment, includes an adaptive processing module 180 that has been modified, relative to the system illustrated in FIG. 1, by adding the navigation position and orientation input to the Array Biasing Covariance Matrix Model 182. This forces the embedding of the model of FIG. 5 into the processor 184 to generate the time-varying array biasing covariance matrix required to adjust the relative direction of the perceived threats of low-power interferers to be a shaded region in this dynamic environment. This requires continual update of current position and orientation of the array relative to the interfering region, which is expected to be supplied by the platform navigation system. The bias region information, the basis of the biasing scenario model, needs to be loaded into the system at time of mission planning or updated during mission execution.

FIG. 14 is a module diagram for illustrating an improved adaptive antenna array interference cancellation circuit 100 for eliminating both high power interference and biasing against regions of suspected low level interference as applied to a GPS navigation application, according to one embodiment. It should be understood that in the presently described embodiment, the navigation system itself is being protected where previously a generic communication system was being protected. In other words, in FIG. 13, the system navigation information providing relative location of off-platform interferers was provided by other systems on-board the platform where the system of FIG. 14 is protecting the navigation system links and gets its position feedback from the protected navigation system. An inertial measurement unit (IMU) is integrated into the array to aid the GPS receivers in tightly coupled navigation algorithms. A micro-electo-mechanical system (MEMS) IMU is the most practical with today's technology in size, precision, and cost tradeoffs. In the implementation presented, the receivers support a GPS navigation system which is necessary for some applications of this present disclosure if no separate platform navigation system is available to provide the navigation position and orientation for a dynamic biasing application. In the GPS navigation application, the receivers provide their position, navigation, and time information 155 to the navigation solution module which provides current navigation information to the adaptive processor module.

The MEMS IMU 170 provides motion dynamics data 175 to the GPS receivers, the navigation solution processor and the adaptive processing control. The IMU is placed as close to the array phase center as possible to minimize offset and beam deflection error of the platform flexure. The receivers use this data for tightly coupled tracking algorithms. The adaptive processing control 180 uses the IMU data 175 to project tracking angle of arrival for both desired signal pilot vector, if used, and biasing direction if relative to changing position. The Navigation solution processor uses the IMU data for GPS smoothing and tracking through outages.

The P vector may be a vector pointing the array to track a particular transmitter signal in space. These signals may be moving relative to the platform independent to the platform motion. The P vector in this situation is continually changing to track this transmitter but is provided from outside of the disclosed process. There may also be multiple transmitters to track with the same communications array. In this situation, multiple P vectors may be processed in parallel using the same [R] matrix to generate parallel W vectors for independent receiver feeds.

The foregoing is construed as only being an illustrative embodiment of this invention. Persons skilled in the art can easily conceive of alternative arrangements providing functionality similar to this embodiment without any deviation from the fundamental principles or the scope of the invention.

What is claimed is:

1. A method for biasing an adaptive antenna array against a reception area that is a potential source of low level interference without substantially affecting the quality of a desired signal reception, the method comprising:

in a pre-processing stage, performing a step of:

a) generating a bias covariance matrix of a simulated interference environment using bias region information comprising:

postulating a threat region in angle of arrival where low-power level interference is likely to originate;

generating a scenario of low-power and equi-power signals distributed across a postulated threat region;

modeling a platform antenna array pattern in both spatial location and element factor to calculate modeled received signal vectors at each element of the array;

calculating a biasing covariance matrix $[C_b]$ from the modeled received signal vectors;

loading the array biasing covariance matrix $[C_b]$ into a system adaptive processor; and loading a pilot vector P into the system adaptive processor, in an operational stage, performing the steps of:

b) adding the bias covariance matrix to a time-varying operational covariance matrix to generate a composite system covariance matrix;

c) calculating an updated adaptive weight vector utilizing the composite system covariance matrix to control a plurality of antenna elements; and d) applying the updated adaptive weight vector to the plurality of antenna array elements to generate an adaptive antenna array output pattern biased against a reception area that is a potential source of low level interference.

2. A method according to claim 1, wherein step (b) of calculating a biasing covariance matrix $[C_b]$ from the modeled received signal vector, further comprises:

a) defining a number of signals "s" to be modeled in the biasing scenario;

b) defining the number of uniform frequency bands "j" that an operational bandwidth is divided into for broadband modeling;

c) defining the received signal (I,Q) complex scalar at element o, for signal k, due to frequency l, as $y_{okl}$;

d) forming a complex (I,Q) scalar $X_o$ for array elements 1 to n using complex (I,Q) scalars for each element;

e) forming the vector X for antenna array elements 1 to n;

f) forming a transpose vector $X_b'$ from $X_b$; and g) computing the biasing covariance matrix $C_b$ from the vectors X and X'.

3. A method according to claim 1, wherein the step (b) of adding the bias covariance matrix to a time-varying operational covariance matrix to control antenna elements to bias the antenna array against the reception area that is a potential source of low level interference, further comprises:

a. simultaneously sampling each element receive signal vector via a digital receiver at a sufficient data rate to meet Nyquist bandwidth sampling rules, wherein each receive signal vector has a one-to-one correspondence to one of said antenna array elements;

b. using time-synchronous sets of element samples to calculate an instantaneous covariance matrix $[C_t]$ for time t;

c. summing together a group "n" of instantaneous covariance matrices from time t to time t−nT to form a time averaged covariance matrix $[C_c]$;

d. adding the current scenario covariance matrix $[C_c]$ and the array biasing covariance matrix $[C_b]$ to form a total system covariance matrix [R];

e. calculating a new, updated weight vector W from the total system covariance matrix;

f. using the updated weight vector W in a real-time weighting and summation to form an array output vector W;

g. multiplying output vector W by vector $X_t$ to form output scalar $y_t$;

h. feeding the array output sequence $y_t$ to a system receiver to allow the receiver to demodulate the received signals;

i. repeating steps (a)-(g).

4. A method according to claim 3, wherein step (c) of summing together a group of instantaneous covariance matrices from time t to time t−nT, further comprises:

a. defining the number of elements "n" in the adaptive antenna array;

b. defining the number of time samples, "m", of the instantaneous covariance matrix to be integrated into the covariance matrix;

c. defining a complex scalar sample of array element "i" at time "t" as $X_{it}$;

d. forming a complex vector $X_t$ for array elements 1 to n at time t using synchronous complex (I,Q) samples from each element;

e. forming a transpose vector $X_t'$ from $X_t$;

f. forming the complex matrix $C_t$;

g. forming the time-averaged covariance matrix $C_c$ from the complex matrix $C_t$.

5. A method according to claim 4, wherein the covariance matrix $C_c$ is formed from the complex matrix $C_t$ as:

$$[C_c]=(\Sigma C_t, t=t_0, t_0-mT)/m$$

where:

$t_0$=current time m=number of time samples being integrated

T=independent sample interval $C_t$=Covariance matrix computed from samples $X_t$, at time t.

6. A method according to claim 4, where n is equal to or greater than 2 for filtering out thermal noise.

7. A method according to claim 3, where T is greater than 10 times Nyquist sampling rate of signal bandwidth to make samples independent relative to Nyquist sampling rate, to form the current scenario covariance matrix $[C_c]$.

8. A method according to claim 1, wherein the pilot vector P is a constant vector and the biasing covariance matrix $C_b$ is a constant vector such that a new pilot vector $P_b$ incorporates the bias supplied by the biasing covariance matrix $C_b$ as an updated steady state quiescent weight W, thereby eliminating the need for repeated matrix updates of the current scenario covariance matrix $[C_c]$ at each weight update interval.

9. A method according to claim 1, wherein the pilot vector P changes in accordance with changes in the operational environment to maintain the desired array steering direction.

10. A method according to claim 1, wherein the pilot vector P comprises a plurality of pilot vectors P for tracking a corresponding plurality of individual transmitters, wherein the plurality of pilot vectors are processed in parallel with the total system covariance matrix [R] to generate a corresponding plurality of parallel weight vectors W.

11. A method according to claim 1, wherein the array biasing covariance matrix $[C_b]$ changes as the operational environment changes to maintain a bias region direction relative to the array as the platform moves, as specified by the bias region information input.

12. A method according to claim 1, wherein step (c) of calculating an updated adaptive weight vector utilizing the composite system covariance matrix to control a plurality of antenna elements, further comprises:

defining a weight vector "W" of length n as a complex vector representing complex weights multipliers of complex digital signals (I,Q) from each of the antenna elements in the adaptive antenna array;

defining a pilot weight vector "P" of length "n" as the quiescent complex weight vector of the antenna elements in the adaptive antenna array;

defining a covariance matrix $C_b$;

defining a time-averaged covariance matrix $C_c$ as a covariance matrix of a current scenario;

forming the composite time averaged covariance matrix [R] from the sum of individual covariance matrices $[C_c]$ and $[C_b]$;

inverting the matrix [R] to form the matrix $[R]^{-1}$;

forming a new adapted weight vector W from the product of the inverted covariance matrix $[R]^{-1}$ and the pilot vector P.

13. A system for biasing an adaptive antenna array against a reception area that is a potential source of low level interference without substantially affecting the quality of a desired signal reception, the system comprising:

a) an adaptive antenna array comprised of a plurality of antenna elements providing RF analog output signals;

b) a plurality of digital receivers, where each receiver is coupled to one of the corresponding plurality of antenna elements for sampling and digitizing the RF analog output signals as input to generate therefrom a continuous sequence of digitized time-varying element time samples (135) of the antenna array elements, which are simultaneously provided as output to a digital weight and summation module (140) and an adaptive processing module (180);

c) said digital weight and summation module (140) operable to apply an updated adaptive weight vector to the time samples from the plurality of antenna array elements to generate an adaptive antenna array output pattern biased against a reception area that is a potential source of low level interference;

d) a processor (184) operable to:

1) execute a computer program for generating a computer model of an adaptive antenna array for a plurality of desired simulated threat signals, the computer program having a first input comprising bias region information of a postulated threat scenario; and a second input comprising an array configuration including platform relative x, y, and z locations, roll, pitch, and yaw orientation, and element factors of reception phase and amplitude from sampled angle of arrivals;

2) generate a bias covariance matrix of a simulated interference environment using said bias region information comprising the steps of:

postulating a threat region in angle of arrival where low-power level interference is likely to originate;

generating a scenario of low-power and equi-power signals distributed across a postulated threat region;

modeling a platform antenna array pattern in both spatial location and element factor to calculate modeled received signal vectors at each element of the array;

calculating a biasing covariance matrix $[C_b]$ from the modeled received signal vectors;

loading the array biasing covariance matrix $[C_b]$ into a system adaptive processor; and loading a pilot vector P into the system adaptive processor;

3) calculate a time-varying operational covariance matrix;

4) add the bias covariance matrix to a time-varying operational covariance matrix to generate a composite system covariance matrix;

5) calculate an updated adaptive weight vector utilizing the composite system covariance matrix;

6) output the updated weight vector to the weighting and summation module;

e) said adaptive processing control module (180) configured to calculate a covariance matrix to generate a composite system covariance matrix and further configured to calculate adaptive weight values based on a real-time interference threat scenario, said adaptive weight values to be applied to a continuous sequence of digitized time-varying element time samples (135) of the antenna array elements, output from the plurality of antenna elements.

14. A system in accordance with claim 13, wherein the digital weight and summation module (140) performs a vector (X) by vector (W) multiplication to form a scalar output sequence Y.

15. A system in accordance with claim 14, where the vector (X) comprises synchronous time samples as complex scalars from each element of the array.

16. A system in accordance with claim 14, where the vector (W) comprises complex weights for each element of the array.

17. A system in accordance with claim 13, wherein the adaptive processing control module comprises:

a covariance matrix formation module (181) configured to use the element received signal streams (135) as input to form a time-averaged covariance matrix as output for a real-time interference threat scenario;

an array biasing covariance matrix module configure to store an array covariance biasing matrix; and a weight vector calculation module (183) configured to add a time-averaged covariance matrix $C_c$ as a covariance matrix of a real-time interference threat scenario with an array biasing covariance matrix $[C_b]$ to calculate the adaptive weights.

18. A system in accordance with claim 13, wherein said computer program generates a model of the biasing scenario in space and uses the array configuration to calculate an array biasing covariance matrix to direct the elements of the adaptive array for a pre-programmed artificial threat scenario.

19. A system in accordance with claim 13, wherein the digital weight and summation module (140) performs a vector (X) by multiple vectors ($W_i$) multiplication to form multiple scalar output sequences $Y_i$, each $W_i$ based upon a separate pilot vector $P_i$, each tracking an individual transmitter, such that $Y_i$ represents the protected signal data stream from an individual transmitter, i, being tracked.

* * * * *